United States Patent
Kobayashi et al.

(10) Patent No.: US 8,530,571 B2
(45) Date of Patent: Sep. 10, 2013

(54) POLYAMIDE COMPOSITIONS HAVING HIGH ACID ENDS

(75) Inventors: Toshikazu Kobayashi, Chadds Ford, PA (US); Marvin M. Martens, Bettendorf, IA (US); Shengmei Yuan, Newark, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 202 days.

(21) Appl. No.: 12/965,077

(22) Filed: Dec. 10, 2010

(65) Prior Publication Data

US 2011/0152450 A1 Jun. 23, 2011

Related U.S. Application Data

(60) Provisional application No. 61/288,412, filed on Dec. 21, 2009.

(51) Int. Cl.
*C08G 69/26* (2006.01)
*C08L 77/06* (2006.01)

(52) U.S. Cl.
USPC ........... 524/606; 524/607; 524/538; 528/335; 528/340; 525/420

(58) Field of Classification Search
USPC ............... 524/606, 607, 538; 528/335, 340; 525/420
See application file for complete search history.

(56) References Cited

U.S. PATENT DOCUMENTS 6,846,868 B2 * 1/2005 Oka et al. ............... 524/413
2007/0083033 A1 4/2007 Fish, Jr. et al.
2009/0098325 A1 * 4/2009 Uchida et al. ........... 428/36.91

FOREIGN PATENT DOCUMENTS

WO WO 2006098434 A1 * 9/2006

OTHER PUBLICATIONS

WO2008149862, Abstract, Asahi chem. corp. Dec. 11, 2008.
JP2002-179910, Patent Abstracts of Japan Jun. 26, 2002.
JP2003-055549, Patent Abstracts of Japan Feb. 26, 2003.
International Search Report, PCT/US2010/061568 filed Dec. 21, 2010.

* cited by examiner

*Primary Examiner* — Michael Pepitone

(57) ABSTRACT

Disclosed is a thermoplastic composition including (A) a polyamide resin independently selected from the group consisting of Group (I) Polyamides having a melting point of at least 260° C., and comprising (a) greater than 95 mole percent semiaromatic repeat units and (b) less than 5 mole percent aliphatic repeat units; (B) 0 to 60 weight percent of one or more reinforcement agents; and
(C) 0 to 50 weight percent of one or more a polymeric tougheners; wherein the weight percentages are based on the total weight of said thermoplastic composition; and wherein said polyamide resin has at least 50 meq/Kg of acid ends.

3 Claims, No Drawings

POLYAMIDE COMPOSITIONS HAVING HIGH ACID ENDS

CROSS REFERENCE TO RELATED INVENTIONS

This application claims the benefit of priority of U.S. Provisional Application No. 61/288,412, filed on Dec. 21, 2009, and currently pending.

FIELD OF INVENTION

The present invention relates to the field of polyamides that have high acid ends and improved hydrolysis resistance.

BACKGROUND OF INVENTION

Resins based on polyamides possess desirable chemical resistance, processability and heat resistance. This makes them well suited for demanding high performance automotive and electrical/electronics applications Unfortunately, with the existing technologies, molded articles based on polyamide compositions have limited hydrolysis resistance at elevated temperatures. There remains a need for polyamide compositions that are suitable for manufacturing articles that exhibit good hydrolysis resistance and maintain good mechanical properties after long-term exposure to hydrolytic conditions, for instance, 5 to 50 days at 120° C.

SUMMARY OF INVENTION

Disclosed is a thermoplastic composition comprising
A) a polyamide resin independently selected from the group consisting of
  Group (1) Polyamides having a melting point of at least 260° C., and comprising
  (a) greater than 95 mole percent semiaromatic repeat units derived from monomers selected from one or more of the group consisting of:
    i) aromatic dicarboxylic acids having 8 to 20 carbon atoms and aliphatic diamines having 4 to 20 carbon atoms; and
  (b) less than 5 mole percent aliphatic repeat units derived from monomers selected from one or more of the group consisting of:
    ii) an aliphatic dicarboxylic acid having 6 to 20 carbon atoms and said aliphatic diamine having 4 to 20 carbon atoms; and
    iii) a lactam and/or aminocarboxylic acid having 4 to 20 carbon atoms;
B) 0 to 60 weight percent of one or more reinforcement agents; and
C) 0 to 50 weight percent of one or more a polymeric tougheners comprising a reactive functional group and/or a metal salt of a carboxylic acid;
wherein the weight percentages are based on the total weight of said thermoplastic composition; and wherein said polyamide resin has at least about 50 meq/Kg of acid ends.

DETAILED DESCRIPTION

Polyamides are condensation products of one or more dicarboxylic acids and one or more diamines, and/or one or more aminocarboxylic acids, and/or ring-opening polymerization products of one or more cyclic lactams. Suitable cyclic lactams are caprolactam and laurolactam. Polyamides may be fully aliphatic or semi-aromatic. Preferred polyamides are semi-aromatic polyamides.

A semi-aromatic polyamide is a homopolymer, a copolymer, a terpolymer or more advanced polymers formed from monomers containing aromatic groups. Preferably the aromatic groups are repeat units derived from aromatic carboxylic acids such as terephthalate or a mixture of terephthalate with one or more other carboxylic acids, such as isophthalic acid, phthalic acid, 2-methyl terephthalic acid and naphthalic dioic acid. In addition, the one or more aromatic carboxylic acids may be mixed with one or more aliphatic dicarboxylic acids, as disclosed below.

Aliphatic repeat units useful in the resin composition of the present invention are formed from aliphatic and alicyclic monomers such as diamines, dicarboxylic acids, lactams, aminocarboxylic acids, and their reactive equivalents. A suitable aminocarboxylic acid is 11-aminododecanoic acid. Suitable lactams are caprolactam and laurolactam.

Aliphatic carboxylic acid monomers include, but are not limited to, adipic acid (C6), pimelic acid (C7), suberic acid (C8), azelaic acid (C9), decanedioic acid (C10), dodecanedioic acid (C12), tridecanedioic acid (C13), tetradecanedioic acid (C14), and pentadecanedioic acid (C15). Diamines can be chosen among diamines having four or more carbon atoms, including, but not limited to tetramethylene diamine, hexamethylene diamine, octamethylene diamine, decamethylene diamine, dodecamethylene diamine, 2-methylpentamethylene diamine, 2-ethyltetramethylene diamine, 2-methyloctamethylenediamine; trimethylhexamethylenediamine, meta-xylylene diamine, and/or mixtures thereof.

Preferred semi-aromatic polyamides disclosed herein are homopolymers or copolymers wherein the term copolymer refers to polyamides that have two or more amide and/or diamide molecular repeat units. The homopolymers and copolymers are identified by their respective repeat units. For copolymers disclosed herein, the repeat units are listed in decreasing order of mole % repeat units present in the copolymer. The following list exemplifies the abbreviations used to identify monomers and repeat units in the homopolymer and copolymer polyamides (PA):

| | |
|---|---|
| HMD | hexamethylene diamine (or 6 when used in combination with a diacid) |
| T | Terephthalic acid |
| AA | Adipic acid |
| DMD | Decamethylenediamine |
| 6 | ε-Caprolactam |
| DDA | Decanedioic acid |
| DDDA | Dodecanedioic acid |
| I | Isophthalic acid |
| TMD | 1,4-tetramethylene diamine |
| 2-MPMD | 2-methylpentamethylene diamine |
| 4T | polymer repeat unit formed from TMD and T |
| 6T | polymer repeat unit formed from HMD and T |
| DT | polymer repeat unit formed from 2-MPMD and T |
| 66 | polymer repeat unit formed from HMD and AA |
| 10T | polymer repeat unit formed from DMD and T |
| 410 | polymer repeat unit formed from TMD and DDA |
| 510 | polymer repeat unit formed from 1,5-pentanediamine and DDA |
| 610 | polymer repeat unit formed from HMD and DDA |
| 612 | polymer repeat unit formed from HMD and DDDA |
| 6 | polymer repeat unit formed from ε-caprolactam |

| 11 | polymer repeat unit formed from 11-aminoundecanoic acid |
| 12 | polymer repeat unit formed from 12-aminododecanoic acid |

Note that in the art the term "6" when used alone designates a polymer repeat unit formed from ε-caprolactam. Alternatively "6" when used in combination with a diacid such as T, for instance 6T, the "6" refers to HMD. In repeat units comprising a diamine and diacid, the diamine is designated first. Furthermore, when "6" is used in combination with a diamine, for instance 66, the first "6" refers to the diamine HMD, and the second "6" refers to adipic acid. Likewise, repeat units derived from other amino acids or lactams are designated as single numbers designating the number of carbon atoms.

Preferred polyamides for the thermoplastic composition are Group (I) Polyamides having a melting point of at least 260° C., comprising
(a) greater than 95 mole percent semiaromatic repeat units derived from monomers selected from one or more of the group consisting of:
  i) aromatic dicarboxylic acids having 8 to 20 carbon atoms and aliphatic diamines having 4 to 20 carbon atoms; and
(b) less than 5 mole percent aliphatic repeat units derived from monomers selected from one or more of the group consisting of:
  ii) an aliphatic dicarboxylic acid having 6 to 20 carbon atoms and said aliphatic diamine having 4 to 20 carbon atoms; and
  iii) a lactam and/or aminocarboxylic acid having 4 to 20 carbon atoms.

Preferred Group (I) Polyamides are selected from the group consisting of poly(tetramethylene terephthalamide/2-methylpentamethylene terephthalamide) PA4T/DT, poly(tetramethylene terephthalamide/hexamethylene terephthalamide) PA4T/6T, poly(tetramethylene terephthalamide/decamethylene terephthalamide) PA4T/10T, poly(tetramethylene terephthalamide/dodecamethylene terephthalamide)PA4T/12T, poly(tetramethylene terephthalamide/2-methylpentamethylene terephthalamide/hexamethylene terephthalamide) (PA4T/DT/6T), poly(tetramethylene terephthalamide/hexamethylene terephthalamide/2-methylpentamethylene terephthalamide) (PA4T/6T/DT), poly(hexamethylene terephthalamide/2-methylpentamethylene terephthalamide) (PA6T/DT), poly(hexamethylene hexanediamide/hexamethylene isophthalamide) (PA 6T/6I), poly(hexamethylene terephthalamide/decamethylene terephthalamide) PA6T/10T, poly(hexamethylene terephthalamide/dodecamethylene terephthalamide) (PA6T/12T), poly(hexamethylene terephthalamide/2-methylpentamethylene terephthalamide/poly(decamethylene terephthalamide) (PA6T/DT/10T), poly(hexamethylene terephthalamide/decamethylene terephthalamide/dodecamethylene terephthalamide) (PA6T/10T/12T), poly(decamethylene terephthalamide) (PA10T), poly(decamethylene terephthalamide/tetramethylene terephthalamide) (PA10T/4T), poly(decamethylene terephthalamide/2-methylpentamethylene terephthalamide) (PA10T/DT), poly(decamethylene terephthalamide/dodecamethylene terephthalamide) (PA10T/12T), poly(decamethylene terephthalamide/2-methylpentamethylene terephthalamide/(decamethylene terephthalamide) (PA10T/DT/12T). poly(dodecamethylene terephthalamide) (PA12T), poly(dodecamethylene terephthalamide)/tetramethylene terephthalamide) (PA12T/4T), poly(dodecamethylene terephthalamide)/hexamethylene terephthalamide) PA12T16T, poly(dodecamethylene terephthalamide)/decamethylene terephthalamide) (PA12T/10T), and poly(dodecamethylene terephthalamide)/2-methylpentamethylene terephthalamide) (PA12T/DT); and a most preferred Group (I) Polyamide is PA6T/DT.

The thermoplastic composition preferably comprises 20 to 100 weight percent of A) a polyamide independently selected from the group consisting of Group (I) Polyamides, as disclosed above.

The thermoplastic composition may include 0 to 60 weight percent of one or more reinforcement agents. In one embodiment the thermoplastic composition includes about 10 to 60 weight percent of one or more reinforcement agents.

In another embodiment the composition includes less than 10 weight percent of one or more reinforcement agents, and preferably less than 1 weight %.

The reinforcement agent may be any filler, but is preferably selected from the group consisting calcium carbonate, glass fibers with circular and noncircular cross-section, glass flakes, glass beads, carbon fibers, talc, mica, wollastonite, calcined clay, kaolin, diatomite, magnesium sulfate, magnesium silicate, barium sulfate, titanium dioxide, sodium aluminum carbonate, barium ferrite, potassium titanate and mixtures thereof.

Glass fibers with noncircular cross-section refer to glass fiber having a cross section having a major axis lying perpendicular to a longitudinal direction of the glass fiber and corresponding to the longest linear distance in the cross section. The non-circular cross section has a minor axis corresponding to the longest linear distance in the cross section in a direction perpendicular to the major axis. The non-circular cross section of the fiber may have a variety of shapes including a cocoon-type (figure-eight) shape, a rectangular shape; an elliptical shape; a roughly triangular shape; a polygonal shape; and an oblong shape. As will be understood by those skilled in the art, the cross section may have other shapes. The ratio of the length of the major axis to that of the minor access is preferably between about 1.5:1 and about 6:1. The ratio is more preferably between about 2:1 and 5:1 and yet more preferably between about 3:1 to about 4:1. Suitable glass fiber are disclosed in EP 0 190 001 and EP 0 196 194.

The thermoplastic composition, optionally, comprises 0 to 50 weight percent of one or more polymeric tougheners comprising a reactive functional group and/or a metal salt of a carboxylic acid. In one embodiment the thermoplastic composition comprises 2 to 20 weight percent of one or more polymeric tougheners selected from the group consisting of: a copolymer of ethylene, glycidyl (meth)acrylate, and optionally one or more (meth)acrylate esters; an ethylene/α-olefin or ethylene/α-olefin/diene copolymer grafted with an unsaturated carboxylic anhydride; a copolymer of ethylene, 2-isocyanatoethyl (meth)acrylate, and optionally one or more (meth)acrylate esters; and a copolymer of ethylene and acrylic acid reacted with a Zn, Li, Mg or Mn compound to form the corresponding ionomer. The term "(meth)acrylate" is meant to include acrylate esters and methacrylate esters.

The thermoplastic composition may also comprise other additives commonly used in the art, such other heat stabilizers or antioxidants referred to as "co-stabilizers", antistatic agents, blowing agents, lubricants, plasticizers, and colorant and pigments.

Co-stabilizers including copper stabilizers, secondary aryl amines, hindered amine light stabilizers (HALS), hindered phenols, and mixtures thereof, may be used in the compositions of the invention. Preferred co-stabilizers are selected from the group consisting of secondary aryl amines, hindered amine light stabilizers (HALS), hindered phenols, and mixtures thereof.

Herein the thermoplastic composition is a mixture by melt-blending, in which all polymeric ingredients are adequately mixed, and all non-polymeric ingredients are adequately dispersed in a polymer matrix. Any melt-blending method may be used for mixing polymeric ingredients and non-polymeric ingredients of the present invention. For example, polymeric ingredients and non-polymeric ingredients may be fed into a melt mixer, such as single screw extruder or twin screw extruder, agitator, single screw or twin screw kneader, or Banbury mixer, and the addition step may be addition of all ingredients at once or gradual addition in batches. When the polymeric ingredient and non-polymeric ingredient are gradually added in batches, a part of the polymeric ingredients and/or non-polymeric ingredients is first added, and then is melt-mixed with the remaining polymeric ingredients and non-polymeric ingredients that are subsequently added, until an adequately mixed composition is obtained. If a reinforcing filler presents a long physical shape (for example, a long glass fiber), drawing extrusion molding may be used to prepare a reinforced composition.

The polyamide has at least about 50 meq/Kg of acid ends, preferably at least about 60 meq/Kg of acid ends, and more preferably about 80 meq/Kg of acid ends. Acid ends are be determined by titrating a 2 percent solution of polyamide in a solvent mixture of o-cresol/o-dichlorobenzene (95:5 by volume) with 0.03N potassium hydroxide solution in benzyl alcohol. The end point is determined by potentiometric titration.

Amine ends may be determined by titrating a 2 percent solution of polyamide in a phenol/methanol/water mixture (50:25:25 by volume) with 0.1 N hydrochloric acid. The end point may be determined potentiometrically or conductometrically. (See Kohan, M. I. Ed. *Nylon Plastics Handbook*, Hanser: Munich, 1995; p. 79 and Waltz, J. E.; Taylor, G. B. *Anal. Chem.* 1947 19, 448-50.)

The polyamide preferably has an inherent viscosity of at least about 0.8 to about 1.20, and preferably 0.8 to about 1.15 as measured in m-cresol following ASTM D5225.

The polyamide has melting point of at least 260° C. By "melting point" is meant the second melting point of the polymer as measured according to ISO 11357 and ASTM D3418.

The polyamide may be prepared by any means known to those skilled in the art, such as in an batch process using, for example, an autoclave or using a continuous process. See, for example, Kohan, M. I. Ed. *Nylon Plastics Handbook*, Hanser: Munich, 1995; pp. 13-32. Additives such as lubricants, antifoaming agents, and end-capping agents may be added to the polymerization mixture.

Another aspect relates to the use of the above disclosed thermoplastic compositions for high temperature applications.

Another aspect relates to a method for manufacturing an article by shaping the thermoplastic composition of the invention. Examples of articles are films or laminates, automotive parts or engine parts or electrical/electronics parts. By "shaping", it is meant any shaping technique, such as for example extrusion, injection molding, thermoform molding, compression molding or blow molding. Preferably, the article is shaped by injection molding or blow molding.

The compositions disclosed herein may have application in many vehicular components that meet one or more of the following requirements: high impact requirements; significant weight reduction (over conventional metals, for instance); resistance to high temperature; resistance to oil environment; resistance to chemical agents such as coolants; and noise reduction; allowing more compact and integrated design. Specific molded or extruded thermoplastic articles are selected from the group consisting of charge air coolers (CAC); cylinder head covers (CHC); oil pans; engine cooling systems, including thermostat and heater housings and coolant pumps; exhaust systems including mufflers and housings for catalytic converters; air intake manifolds (AIM); and timing chain belt front covers. As an illustrative example of desired mechanical resistance against long-term high temperature exposure, a charge air cooler can be mentioned. A charge air cooler is a part of the radiator of a vehicle that improves engine combustion efficiency. Charge air coolers reduce the charge air temperature and increase the density of the air after compression in the turbocharger thus allowing more air to enter into the cylinders to improve engine efficiency. Since the temperature of the incoming air can be more than 200° C. when it enters the charge air cooler, it is required that this part be made out of a composition maintaining good mechanical properties under high temperatures for an extended period of time.

Methods

Compounding and Molding Methods

The compositions were made by mixing in a Caperion 26 mm mega compounder at a nominal rate of about 25 kg/h at melt temperature between 340-360° C. All resin components and additives were fed from one feeder at the back of the extruder. The chopped fibers were fed from a side feeder in the middle of the extruder. The compounded pellets were molded into 4 mm multipurpose tensile bars on a Nissie FN3000 injection molding machine with melt temperature about 325° C.

Sample Preparation and Physical Testing

The compositions of the Examples and Comparative Examples were molded into 4 mm ISO all-purpose bars. The test pieces were used to measure mechanical properties on samples at 23° C. and dry as molded.

Tensile strength, elongation at break, and tensile modulus were tested dry as molded on a tensile tester by ISO 527-1/-2 at 23° C. and stain rate of 5 mm/min at room temperature.

For notched izod test, multipurpose tensile bars were cut, notched and tested dry as molded on a CEAST Impact Tester by ISO 180 at 23° C.

Pressure Cooker Test

Test bars were also conditioned in an autoclave at 121° C., 2 atm, and 100% relative humidity for preset time. Mechanical properties were measured on the conditioned test bars and the results were compared to the properties of the unconditioned bars. The mechanical properties of the conditioned bars and the percentage retention of the physical properties are given in Tables. A greater retention of physical properties indicates better hydrolysis resistance.

Materials

Cu stabilizer refers to an inorganic copper salt thermal stabilizer.

Licowax® OP is a partially saponified ester wax manufactured by Clariant Corp., Charlotte, N.C. 28205, USA.

Talc is M 10-52 talc manufactured by Barretts Minerals, Inc., Dillon, Mont., USA.

PPG3540 is a chopped sized glass with 3.2 mm length from PPG Industries.

Polymer A refers to HTN501 NC010, a polyamide 6T/DT copolymer having a melting point in the range of 295 to 305° C., inherent viscosity (IV) of about 0.88, acid end group value of about 40, amine end group value of about 50, available from E.I. DuPont de Nemours, Wilmington, Del.

Polymer B refers to a polyamide 6T/DT copolymer having a melting point in the range of 295 to 305° C., IV of 0.90, and acid end group value of 34, and amine end group value of 77, prepared according to the following procedure:

Polyamide Salt Preparation: Polyamide 6T/DT 50/50 salt solution of approximately 40 percent by weight in water was prepared as follows: 352 kg of a 92 percent by weight in water of a 50:50 weight ratio of hexamethylene diamine and 2-methyl-1,5-pentamethylenediamine blend, 464 kg of terephthalic acid and 1210 kg of water were added to a salt tank. The salt solution was sparged with nitrogen, recirculated and heated to 90° C. After complete dissolution, the salt solution was adjusted to a pH of 8.5±0.2. An additional amount of 17.7 kg of a 92 percent by weight in water of a 50:50 hexamethylene diamine and 2-methyl-1,5-pentamethylenediamine blend, 17.7 kg of pure 2-methyl-1,5-pentamethylenediamine, 145 g of sodium hypophosphite and 2.0 kg of a 28 percent by weight acetic acid in water were added to the salt tank. The polyamide 6T/DT salt solution thus prepared was then charged to a feed tank where the salt solution was maintained at 90° C.

Continuous Polymerization Process Conditions: The salt solution was then continuously pumped from the feed tank to a polymerizer at a salt rate required to maintain a 90 minute hold up time in the polymerizer. An master batch solution consisting of 1.2 kg of water, 7.7 kg of 2-methyl-1,5-pentamethylenediamine, 7.0 kg of a 28 percent by weight acetic acid in water, and 1.5 g of Carbowax 8000, was injected at a rate of 20 ml/min into the salt feed going into the polymerizer. The polymerizer was operated at 245° C. and 395 psia pressure where the salt was concentrated, pre-polymerized and steam and other volatile components were continuously vented. The concentrated prepolymer was then fed to a flashing unit by a flasher feed pump where the prepolymer was further polymerized, water was removed and pressure was brought down gradually to ambient pressure. Meanwhile, temperature was raised from 245° C. to 320° C. at the exit of the flashing unit. The polymer was then fed to a finisher, which was maintained at a vacuum of 400 mm of Hg where further molecular weight build up was carried out and water was removed. The finisher temperature was 320° C. and hold up time was controlled to give the desired IV product. Finally the polymer melt was pumped from the finisher to a die through a transfer line, extruded into thin strands, cooled, cut into pellets and collected. The polymer rate was approximately 30 kg per hour.

Polymer C refers to a polyamide 6T/DT copolymer having a melting point in the range of 295 to 305° C., IV of about 1.02, and acid end group value of 34, and an amine end value of 83.

Polymer C was made using the same salt recipe and polymerization process conditions as Polymer B except that the master batch solution was 7.0 kg of water, 6.3 kg of 2-methyl-1,5-pentamethylenediamine, 2.6 kg of a 28 percent by weight acetic acid in water and 1.5 g of Carbowax 8000.

EXAMPLE 1

Example 1 illustrates the synthesis of a thermoplastic polyamide having a high acid end value.

Polymer D refers to a polyamide 6T/DT copolymer having a melting point in the range of 295 to 305° C., IV of about 0.88, and acid end group value of 74 and an amine end group value of 34.

Polymer D was made using the same salt recipe and polymerization process conditions as Polymer B except that the master batch solution was 8.3 kg of water, 2.1 kg of 2-methyl-1,5-pentamethylenediamine, 5.5 kg of a 28 percent by weight acetic acid in water and 1.5 g of Carbowax 8000.

EXAMPLE 2

Example 2 illustrates the synthesis of a thermoplastic polyamide having a high acid end value.

Polymer E refers to a polyamide 6T/DT copolymer having a melting point in the range of 295 to 305° C., IV of about 0.97, and acid end group value of 101, and an amine end group value of 27.

Polymer E was made using the same salt recipe and polymerization process conditions as Polymer B except that the master batch was made by adding 8.9 kg of water, 3.3 kg of 2-methyl-1,5-pentamethylenediamine, 2.2 kg of a 80 percent by weight of hexamethylene diamine in water, 1.67 kg of a 28 percent by weight acetic acid in water and 1.5 g of Carbowax 8000.

EXAMPLES 3 and 4 and COMPARATIVE EXAMPLES 1-3

The compositions of Examples 3 and 4 and Comparative Example 1-3 are listed in Table 1. The compositions were each formulated to 100.25 parts by weight. Table 1 also lists the physical properties of test bars dry as molded (DAM) and after various PCT exposures.

The data in Table 1 show that the compositions of Examples 3 and 4, comprising polyamide D and E, having acid end values greater than 70 mequiv/Kg, exhibit unexpectedly higher hydrolysis resistance in the pressure cooker test, than those having lower amine end values.

TABLE 1

|  | Example No. | | | | |
| --- | --- | --- | --- | --- | --- |
|  | C-1 | C-2 | C-3 | 3 | 4 |
| Polyamide A | 64.25 | 0 | 0 | 0 | 0 |
| Polyamide B | 0 | 64.25 | 0 | 0 | 0 |
| Polyamide C | 0 | 0 | 64.25 | 0 | 0 |
| Polyamide D | 0 | 0 | 0 | 64.25 | 0 |
| Polyamide E | 0 | 0 | 0 | 0 | 64.25 |
| Licowax ® OP | 0.25 | 0.25 | 0.25 | 0.25 | 0.25 |
| Cu Stabilizer | 0.4 | 0.4 | 0.4 | 0.4 | 0.4 |
| Talc | 0.35 | 0.35 | 0.35 | 0.35 | 0.35 |
| PPG 3540 | 35 | 35 | 35 | 35 | 35 |
| Acid end value (mequiv/Kg) | 40 | 34 | 34 | 74 | 101 |
| Physical Properties, DAM | | | | | |
| Tensile Strength (Mpa) | 232 | 226 | 226 | 223 | 222 |
| Elongation at Break (%) | 2.3 | 2.28 | 2.36 | 2.21 | 2.26 |

TABLE 1-continued

| | Example No. | | | | |
|---|---|---|---|---|---|
| | C-1 | C-2 | C-3 | 3 | 4 |
| Tensile Modulus (Mpa) | 13818 | 13066 | 12288 | 11907 | 11665 |
| Notched Izod (kJ/m2) | 10.3 | 10.1 | 9.72 | 11.1 | 10.6 |
| Pressure Cooker Test | | | | | |
| TS (MPa) 150 h | 173 | 137 | 151 | 171 | 177 |
| TS Retention (%) 150 h | 75 | 61 | 67 | 77 | 80 |
| TS (MPa) 300 h | 143 | 86 | 109 | 151 | 156 |
| TS Retention (%) 300 h | 62 | 38 | 48 | 68 | 70 |
| TS (MPa) 500 h | 124 | 74 | 101 | 133 | 142 |
| TS Retention (%) 500 h | 54 | 33 | 45 | 60 | 64 |
| TS (MPa) 800 h | 105 | 70 | 88 | 119 | 125 |
| TS Retention (%) 800 h | 45 | 31 | 39 | 53 | 56 |

In all Tables:
TS = tensile strength;
DAM = dry as molded;

We claim:

1. A thermoplastic composition comprising
(A) A polyamide resin consisting essentially of poly(hexamethylene terephthalamide/2-methylpentamethylene terephthalamide) wherein the ratio of poly(hexamethylene terephthalarnide/2-methylpentamethylene terephthalamide repeat units is 50/50;
(B) 10 to 60 weight percent of one or more reinforcement agents;
(C) 0 to 50 weight percent of one or more a polymeric tougheners comprising a reactive functional group and/or a metal salt of a carboxylic acid;
wherein the weight percentages are based on the total weight of said thermoplastic composition; and wherein said polyamide resin has at least about 50 meq/Kg of acid ends.

2. The thermoplastic composition of claim 1 wherein said polyamide resin has at least about 60 meq/Kg of acid ends.

3. The thermoplastic composition of claim 1 comprising 2 to 20 weight percent of one or more polymeric tougheners comprising a reactive functional group and/or a metal salt of a carboxylic acid.

* * * * *